(12) United States Patent
Binek et al.

(10) Patent No.: US 11,754,287 B2
(45) Date of Patent: Sep. 12, 2023

(54) FUEL INJECTOR ASSEMBLY FOR A TURBINE ENGINE

(71) Applicant: Raytheon Technologies Corporation, Farmington, CT (US)

(72) Inventors: Lawrence A. Binek, Glastonbury, CT (US); Timothy S. Snyder, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 139 days.

(21) Appl. No.: 17/018,561

(22) Filed: Sep. 11, 2020

(65) Prior Publication Data

US 2022/0082250 A1 Mar. 17, 2022

(51) Int. Cl.
*F23R 3/30* (2006.01)
*F23R 3/04* (2006.01)

(52) U.S. Cl.
CPC ............. *F23R 3/30* (2013.01); *F23R 3/045* (2013.01); *F05D 2220/323* (2013.01)

(58) Field of Classification Search
CPC ......... F23R 3/30; F23R 3/045; F05D 2240/36
See application file for complete search history.

(56) References Cited

U.S. PATENT DOCUMENTS

| | | | |
|---|---|---|---|
| 1,460,470 A | 7/1923 | Askins | |
| 2,385,833 A | 10/1945 | Nahigyan | |
| 2,616,258 A | 11/1952 | Mock | |
| 2,727,358 A | 12/1955 | Howes | |
| 3,053,461 A | 9/1962 | Inglis | |
| 3,153,323 A | 10/1964 | Hamm | |
| 3,430,443 A | 3/1969 | Richardson | |
| 3,603,711 A | 9/1971 | Downs | |
| 3,638,865 A * | 2/1972 | McEneny | F23R 3/28 239/404 |
| 3,693,354 A | 9/1972 | Hull, Jr. | |
| 3,693,889 A | 9/1972 | Schuster | |
| 3,777,983 A | 12/1973 | Hibbins | |

(Continued)

FOREIGN PATENT DOCUMENTS

GB 2545688 A 6/2017
WO 2014143261 A1 9/2014

OTHER PUBLICATIONS

GB Office Action for GB2113222.0 dated Aug. 18, 2022.

*Primary Examiner* — Katheryn A Malatek
(74) *Attorney, Agent, or Firm* — GETZ BALICH LLC

(57) ABSTRACT

An apparatus is provided for a turbine engine. This apparatus includes a fuel conduit and a fuel nozzle. The fuel conduit includes a supply passage. The fuel nozzle includes a nozzle passage, an end wall and a nozzle orifice. The nozzle passage has a longitudinal centerline and extends longitudinally through the fuel nozzle along the longitudinal centerline from the end wall to the nozzle orifice. The nozzle passage is configured with a convergent portion and a throat portion. The nozzle passage converges radially inward towards the longitudinal centerline as the convergent portion extends longitudinally along the longitudinal centerline away from the end wall and towards the throat portion. The supply passage is fluidly coupled to the nozzle passage by a fuel aperture in the end wall. A centerline of the fuel aperture is angularly and laterally offset from the longitudinal centerline.

15 Claims, 10 Drawing Sheets

(56) References Cited

U.S. PATENT DOCUMENTS

| | | |
|---|---|---|
| 3,886,736 A | 6/1975 | Kawaguchi |
| 3,915,137 A | 10/1975 | Evans |
| 3,937,007 A | 2/1976 | Kappler |
| 4,028,044 A | 6/1977 | Carlisle |
| 4,081,958 A | 4/1978 | Schelp |
| 4,134,260 A | 1/1979 | Lefebvre |
| 4,242,863 A | 1/1981 | Bailey |
| 4,295,821 A | 10/1981 | Schilling |
| 4,305,255 A | 12/1981 | Davies |
| 4,835,962 A | 6/1989 | Rutter |
| 5,129,226 A | 7/1992 | Bigelow |
| 5,133,192 A | 7/1992 | Overton |
| 5,423,178 A | 6/1995 | Mains |
| 5,568,721 A | 10/1996 | Alary |
| 5,816,041 A | 10/1998 | Greninger |
| 5,836,163 A | 11/1998 | Lockyer |
| 5,873,237 A | 2/1999 | Medla |
| 6,438,961 B2 | 8/2002 | Tuthill |
| 6,460,344 B1 | 10/2002 | Steinthorsson |
| 6,490,864 B1 | 12/2002 | Joos |
| 6,672,066 B2 | 1/2004 | Wrubel |
| 6,931,862 B2 | 8/2005 | Harris |
| 7,870,736 B2 | 1/2011 | Homitz |
| 7,891,191 B2 | 2/2011 | Yoshida |
| 7,954,328 B2 | 6/2011 | Atassi |
| 9,062,609 B2 | 6/2015 | Mehring |
| 9,383,145 B2 | 7/2016 | Weber |
| 9,803,498 B2 | 10/2017 | Jewess |
| 10,570,865 B2 | 2/2020 | Zhang |
| 10,619,855 B2 | 4/2020 | Brogan |
| 10,739,005 B2 | 8/2020 | Kironn |
| 2002/0069645 A1 | 6/2002 | Mowill |
| 2006/0213180 A1 | 9/2006 | Koshoffer |
| 2007/0044476 A1 | 3/2007 | Koshoffer |
| 2008/0201008 A1 | 8/2008 | Twelves, Jr. |
| 2009/0020266 A1 | 1/2009 | Weber |
| 2009/0255264 A1 | 10/2009 | McMasters |
| 2009/0260365 A1 | 10/2009 | Muldoon |
| 2010/0050653 A1 | 3/2010 | Lam |
| 2010/0083663 A1* | 4/2010 | Fernandes ............... F23R 3/286 60/748 |
| 2010/0281871 A1 | 11/2010 | Hadley |
| 2011/0289928 A1 | 12/2011 | Fox |
| 2011/0296839 A1 | 12/2011 | Van Nieuwenhuizen |
| 2013/0098048 A1 | 4/2013 | Popovic |
| 2016/0209041 A1 | 7/2016 | Twelves, Jr. |
| 2019/0249876 A1* | 8/2019 | Freeman ................ B33Y 80/00 |

* cited by examiner

FUEL INJECTOR ASSEMBLY FOR A TURBINE ENGINE

BACKGROUND OF THE DISCLOSURE

1. Technical Field

This disclosure relates generally to a turbine engine and, more particularly, to a fuel injector for the turbine engine.

2. Background Information

A combustor section in a modern a turbine engine includes one or more fuel injectors. Each fuel injector is operable to inject fuel for combustion within a combustion chamber. Various types and configurations of fuel injectors are known in the art. While these known fuel injectors have various benefits, there is still room in the art for improvement. There is a need in the art, for example, for fuel injectors with reduced manufacturing costs, that facilitate reduced assembly time as well as that reduce likelihood of carbon buildup within the combustion chamber caused by solidification of and/or traces of non-combusted fuel.

SUMMARY OF THE DISCLOSURE

According to an aspect of the present disclosure, an apparatus is provided for a turbine engine. This turbine engine apparatus includes a fuel conduit and a fuel nozzle. The fuel conduit includes a supply passage. The fuel nozzle includes a nozzle passage, an end wall and a nozzle orifice. The nozzle passage has a longitudinal centerline. The nozzle passage extends longitudinally through the fuel nozzle along the longitudinal centerline from the end wall to the nozzle orifice. The nozzle passage is configured with a convergent portion and a throat portion. The nozzle passage converges radially inward towards the longitudinal centerline as the convergent portion extends longitudinally along the longitudinal centerline away from the end wall and towards the throat portion. The supply passage is fluidly coupled to the nozzle passage by a fuel aperture in the end wall. A centerline of the fuel aperture is angularly and laterally offset from the longitudinal centerline.

According to another aspect of the present disclosure, another apparatus is provided for a turbine engine. This turbine engine apparatus includes a fuel conduit and a fuel nozzle. The fuel conduit includes a supply passage. The fuel nozzle includes a nozzle passage, an end wall and a nozzle orifice. The nozzle passage has a longitudinal centerline. The nozzle passage extends longitudinally through the fuel nozzle along the longitudinal centerline from the end wall to the nozzle orifice. The nozzle passage is configured with a convergent portion and a throat portion. The nozzle passage converges radially inward towards the longitudinal centerline as the convergent portion extends longitudinally along the longitudinal centerline from the end wall to the throat portion. The supply passage is fluidly coupled to the nozzle passage by a fuel aperture piercing the end wall. The fuel passage is configured to swirl fuel directed into the nozzle passage from the supply passage.

According to still another aspect of the present disclosure, another apparatus is provided for a turbine engine. This turbine engine apparatus includes an air tube and a fuel nozzle. The air tube includes an air passage. The fuel nozzle projects into the air passage. The fuel nozzle includes a nozzle passage. The fuel nozzle is configured to swirl fuel entering the nozzle passage to provide swirled fuel. The fuel nozzle is configured to accelerate the swirled fuel through the nozzle passage to provide accelerated and swirled fuel. The fuel nozzle is configured to direct the accelerated and swirled fuel into the air passage as a hollow cone for impingement against an interior surface of the air tube.

A centerline of the fuel aperture may be angularly offset from the longitudinal centerline. The centerline of the fuel aperture may also or alternatively be laterally offset from the longitudinal centerline towards a side of the nozzle passage.

The fuel nozzle may include an end wall and a nozzle orifice. The nozzle passage may have a longitudinal centerline. The nozzle passage may extend longitudinally through the fuel nozzle along the longitudinal centerline from the end wall to the nozzle orifice. The nozzle passage may be configured with a convergent portion and a throat portion. The nozzle passage may converge radially inward towards the longitudinal centerline as the convergent portion extends longitudinally along the longitudinal centerline from the end wall to the throat portion. The fuel supply passage may be fluidly coupled to the nozzle passage by a fuel aperture in the end wall. A centerline of the fuel aperture may be angularly and/or laterally offset from the longitudinal centerline.

The fuel aperture may be configured to direct fuel from the supply passage into the nozzle passage along a canted trajectory such that the fuel spirals around the longitudinal centerline.

The fuel aperture may be configured to swirl fuel directed into the nozzle passage from the supply passage.

A longitudinal length of the convergent portion may be greater than a longitudinal length of the throat portion.

The nozzle passage may also be configured with a divergent portion. The nozzle passage may diverge radially outward away from the longitudinal centerline as the divergent portion extends longitudinally along the longitudinal centerline away from the throat portion and towards the nozzle orifice.

A longitudinal length of the convergent portion may be greater than a longitudinal length of the divergent portion.

The longitudinal length of the divergent portion may be greater than a longitudinal length of the throat portion.

A maximum lateral width of the divergent portion may be equal to or greater than a maximum lateral width of the convergent portion.

The supply passage may also be fluidly coupled to the nozzle passage by a second fuel aperture in the end wall. A centerline of the second fuel aperture may be angularly and/or laterally offset from the longitudinal centerline.

The turbine engine apparatus may also include a fuel vaporizer. The fuel nozzle may be configured to direct fuel out from the nozzle orifice and against the fuel vaporizer.

The turbine engine apparatus may also include an air tube that includes an air passage. The fuel nozzle may be configured to direct fuel out from the nozzle orifice and into the air passage to impinge against an inner sidewall surface of the air tube.

The turbine engine apparatus may also include a combustor wall that at least partially forms a combustion chamber. The air tube may be connected to the combustor wall and/or may project into the combustion chamber.

The turbine engine apparatus may also include a turbine engine case. The fuel nozzle may include a nozzle tube and a web. The nozzle tube may project out from the turbine engine case and at least partially form the nozzle passage. The web may extend between the turbine engine case and the nozzle tube.

The turbine engine apparatus may also include a turbine engine case. The fuel conduit, the fuel nozzle and the turbine engine case may be formed together in a monolithic body.

The turbine engine apparatus may also include a second fuel nozzle. This second fuel nozzle may include a second nozzle passage, a second end wall and a second nozzle orifice. The second nozzle passage may have a second longitudinal centerline and may extend longitudinally through the second fuel nozzle along the second longitudinal centerline from the second end wall to the second nozzle orifice. The second nozzle passage may be configured with a second convergent portion and a second throat portion. The second nozzle passage may converge radially inward towards the second longitudinal centerline as the second convergent portion extends longitudinally along the second longitudinal centerline away from the second end wall and towards the second throat portion. The supply passage may be fluidly coupled to the second nozzle passage by a second fuel aperture in the second end wall. A centerline of the second fuel aperture may be angularly and/or laterally offset from the second longitudinal centerline.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
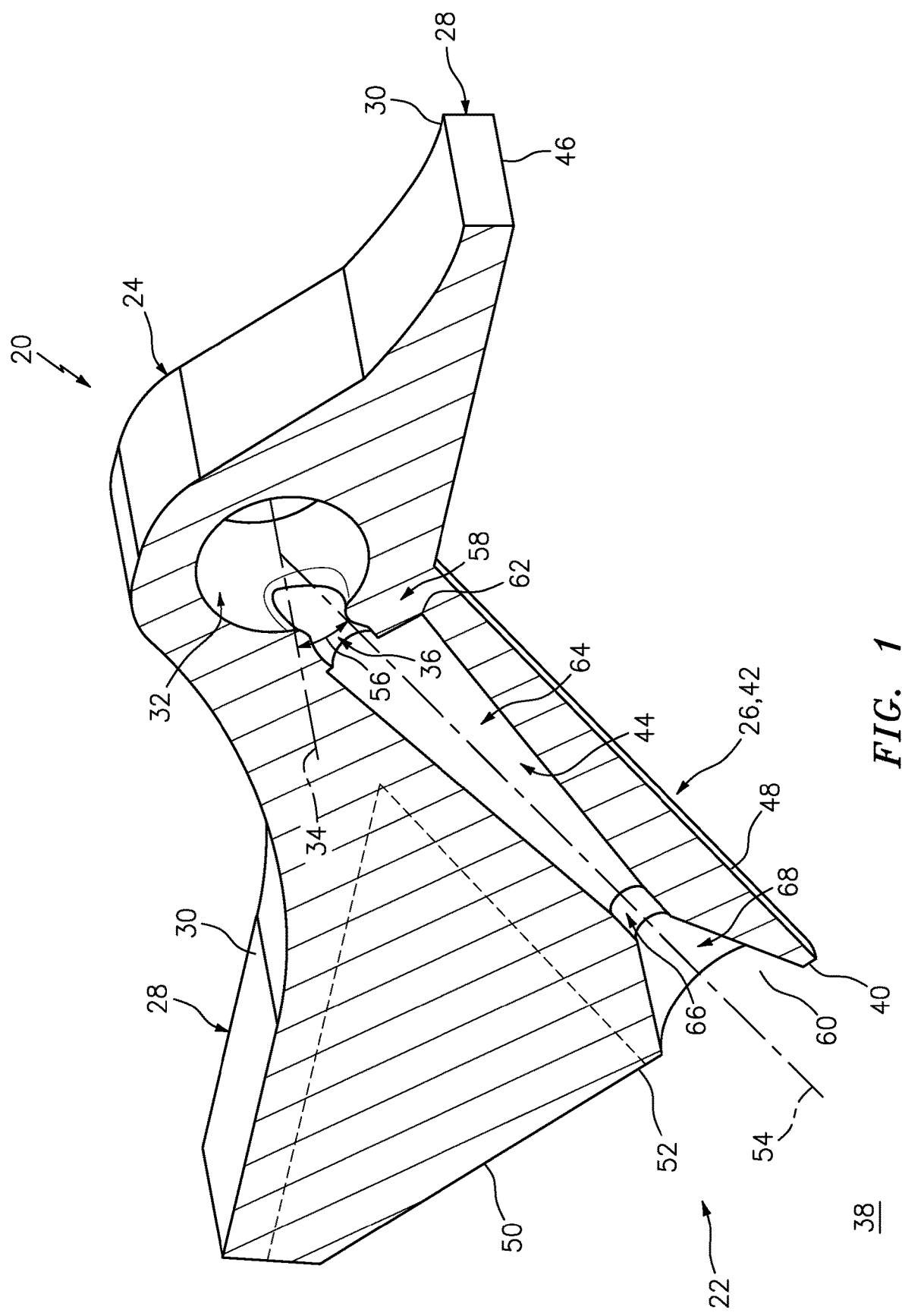
FIG. 1 is a perspective sectional illustration of a portion of a fuel injector assembly for a turbine engine.

FIG. 1 illustrates a portion of an apparatus 20 for a turbine engine. This turbine engine apparatus 20 is configured as, or otherwise includes, a fuel injector assembly 22 for a combustor section of the turbine engine. The turbine engine apparatus 20 includes a fuel conduit 24 and a fuel nozzle 26. The turbine engine apparatus 20 of FIG. 1 may also include a base 28, which base 28 may provide a structural support for the fuel conduit 24 and/or the fuel nozzle 26.

The base 28 may be configured as any part of the turbine engine within the combustor section that is proximate the fuel injector assembly 22. The base 28 of FIG. 1, for example, may be configured as a turbine engine case such as, but not limited to, a combustor section case, a diffuser case and/or a combustor wall.

The fuel conduit 24 is configured as, or may be part of, a fuel supply for the fuel nozzle 26. The fuel conduit 24, for example, may be or may be part of a fuel supply tube, a fuel inlet manifold and/or a fuel distribution manifold. The fuel conduit 24 is arranged at and/or is connected to a first side 30 (e.g., an exterior and/or outer side) of the base 28. The fuel conduit 24 is configured with an internal fuel supply passage 32 formed by an internal aperture (e.g., a bore, channel, etc.) within the fuel conduit 24. The supply passage 32 and the associated aperture extend within and/or through the fuel conduit 24 along a (e.g., curved or straight) centerline 34 of the supply passage 32, which may also be a centerline of the fuel conduit 24.

Figure 2:
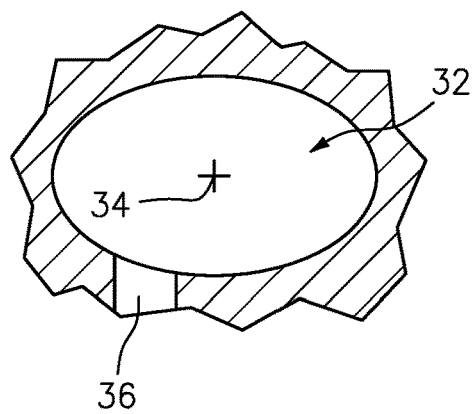
FIGS. 2 and 3 are cross-sectional illustrations of a supply passage within a fuel conduit having various shapes.
Figure 3:
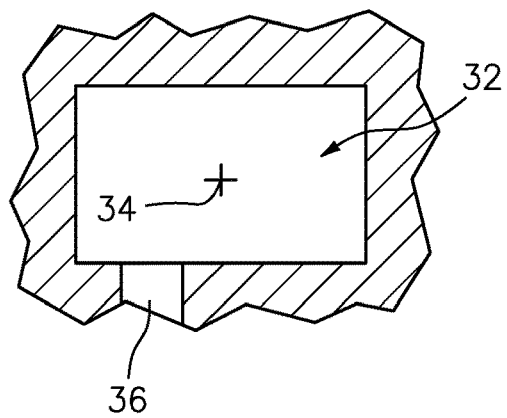

The supply passage 32 has a cross-sectional geometry when viewed, for example, in a plane perpendicular to the supply passage centerline 34. The cross-sectional geometry of FIG. 1 is circular shaped. The present disclosure, however, is not limited to such an exemplary circular cross-sectional geometry. The cross-sectional geometry, for example, may alternatively be non-circular shaped; e.g., oval or elliptical shaped as shown in FIG. 2 for example, polygonal (e.g., rectangular) shaped as shown in FIG. 3 for example, etc.

Referring to FIG. 1, the fuel nozzle 26 is configured to receive fuel from the fuel conduit 24 through at least one fuel aperture 36, and inject the received fuel into a plenum 38 at a distal end 40 (e.g., tip) of the fuel nozzle 26. The fuel nozzle 26 includes a nozzle body 42 and a nozzle passage 44.

Figure 4:
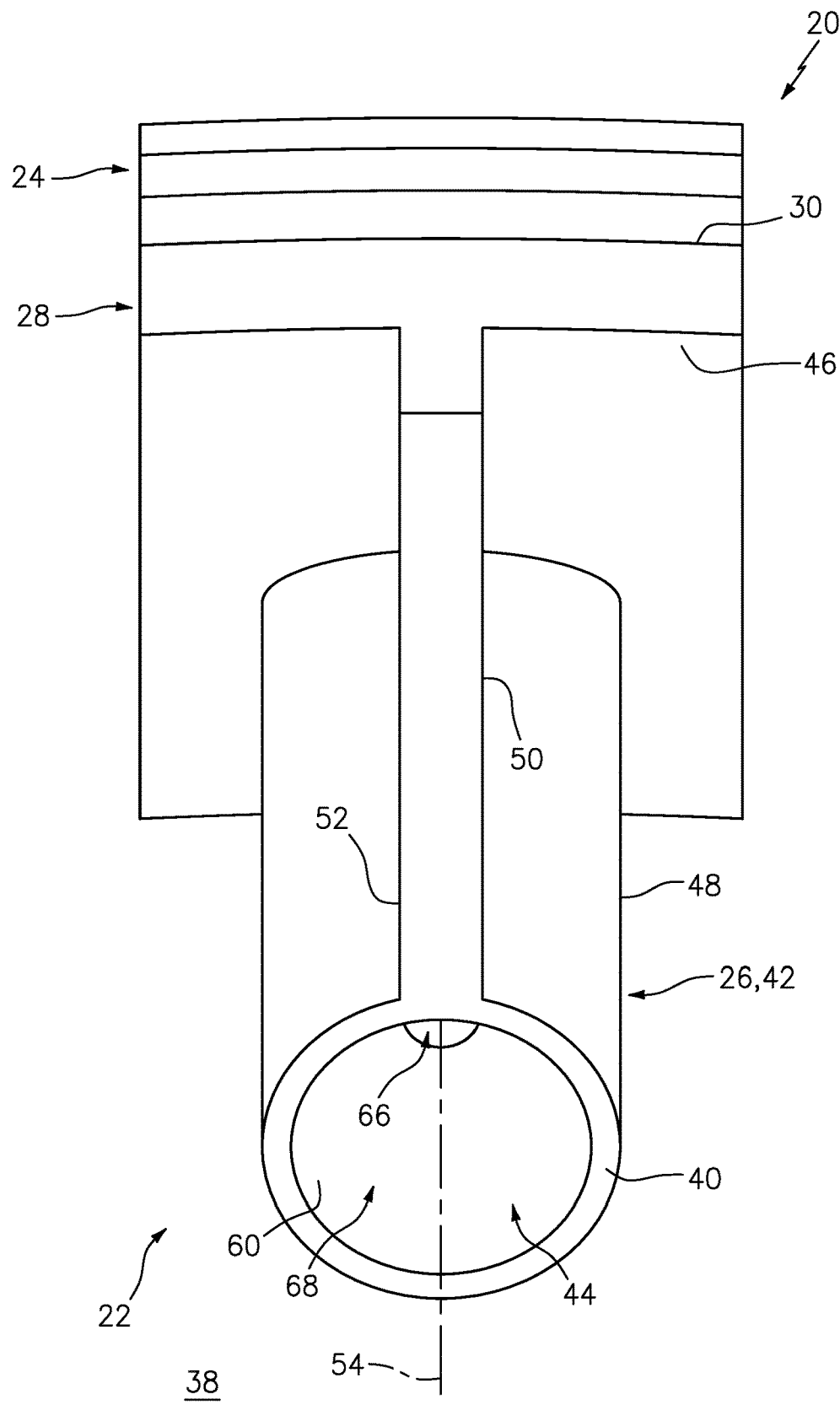
FIG. 4 is another perspective sectional illustration of another portion of the fuel injector assembly.

The nozzle body 42 is arranged at and/or is connected to a second side 46 (e.g., an interior and/or inner side) of the base 28, where the base second side 46 is opposite the base first side 30. The nozzle body 42 of FIG. 1 includes a nozzle tube 48 and a nozzle web 50. A base end of the nozzle tube 48 is connected to the base 28. The nozzle tube 48 projects out from the base 28 to the fuel nozzle distal end 40. The nozzle web 50 is connected to and extends between the base 28 and a side 52 of the nozzle tube 48. The nozzle web 50 structurally ties the nozzle tube 48 to the base 28 and may thereby support the nozzle tube 48 within the plenum 38; see also FIG. 4. The nozzle web 50, for example, may form a support gusset for the nozzle tube 48.

The nozzle passage 44 has a (e.g., straight or curved) longitudinal centerline 54; e.g., a nozzle passage centerline. This longitudinal centerline 54 is angularly offset from the supply passage centerline 34 by an included angle 56. The longitudinal centerline 54 of FIG. 1, for example, is substantially (e.g., within +/−5°) or exactly perpendicular to the supply passage centerline 34. The longitudinal centerline 54, if extended out, may also intersect (e.g., be coincident) with the supply passage centerline 34. The present disclosure, however, is not limited to the foregoing exemplary relationship between the centerlines 34 and 54. For example, the longitudinal centerline 54 may alternatively be angularly offset from the supply passage centerline 34 by an acute angle. The longitudinal centerline 54 may also or alternatively be laterally offset from the supply passage centerline 34 such that, if extended out, the longitudinal centerline 54 does not intersect (e.g., is not coincident) with the supply passage centerline 34.

The nozzle passage 44 extends longitudinally along its longitudinal centerline 54 within and/or through the nozzle tube 48 from an end wall 58 of the fuel nozzle 26 to a nozzle orifice 60 at the fuel nozzle distal end 40. The fuel nozzle end wall 58 is configured to define an interior/upstream end 62 of the nozzle passage 44. The fuel nozzle end wall 58 is also configured to provide a bulkhead between the nozzle passage 44 and the supply passage 32. The nozzle orifice 60 provides an outlet from the nozzle passage 44 and, more generally, the fuel nozzle 26.

Figure 5:
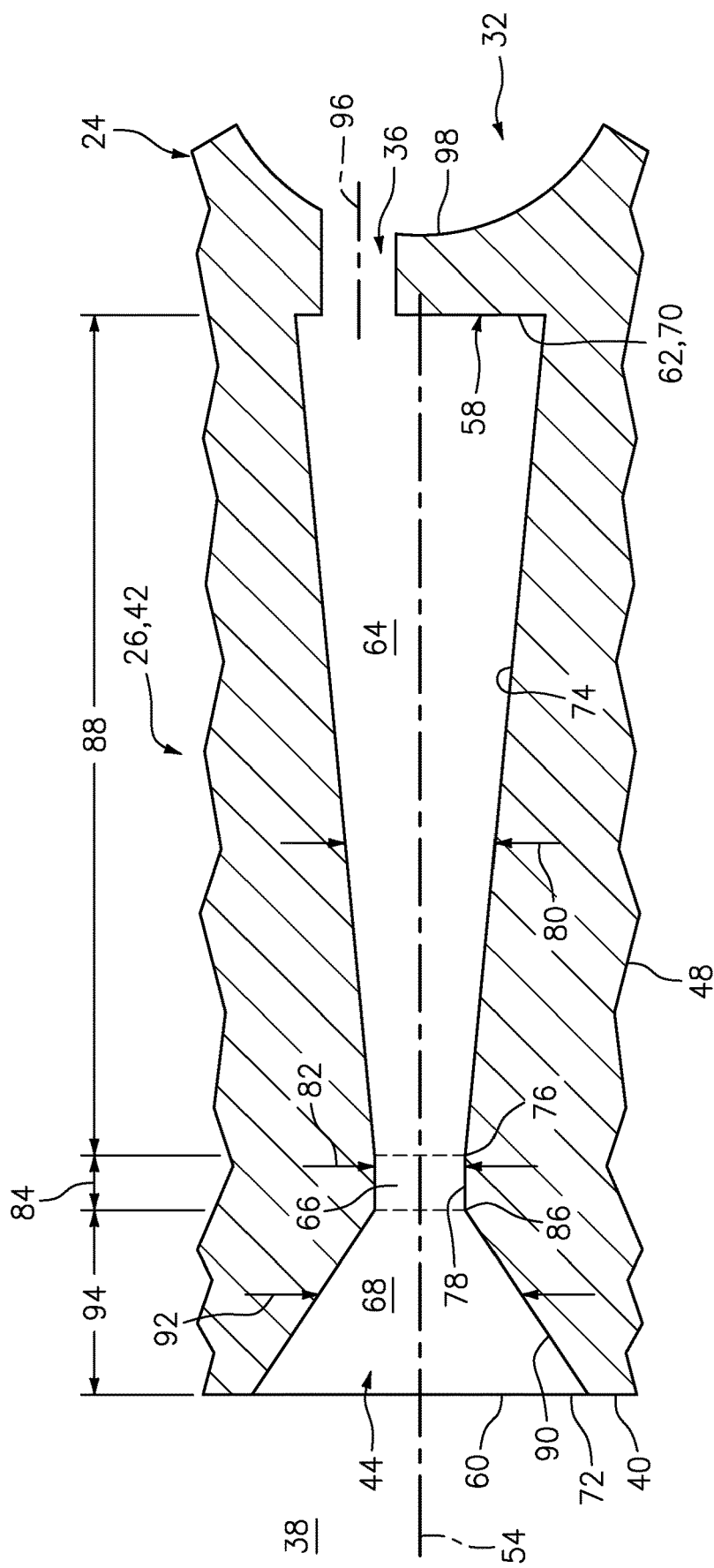
FIG. 5 is a side sectional illustration of another portion of the fuel injector assembly.

Referring to FIG. 5, the nozzle passage 44 includes one or more different flow portions arranged longitudinally along its longitudinal centerline 54. The nozzle passage 44 of FIG. 5, for example, includes a convergent portion 64 and a throat portion 66. The nozzle passage 44 of FIG. 5 also include a divergent portion 68; however, in other embodiments, the divergent portion 68 may be omitted. The convergent portion 64 is upstream of the throat portion 66 and the divergent portion 68, and the throat portion 66 is upstream of the divergent portion 68.

The convergent portion 64 is arranged at (e.g., on, adjacent or proximate) the upstream end 62 of the nozzle passage 44, which nozzle passage upstream end 62 is formed by a nozzle passage end surface 70 of the end wall 58. The convergent portion 64 of FIG. 5, for example, extends longitudinally along the longitudinal centerline 54 from the nozzle passage end surface 70 to the throat portion 66. The throat portion 66 is arranged longitudinally between the convergent portion 64 and the divergent portion 68. The throat portion 66 of FIG. 5, for example, extends longitudinally along the longitudinal centerline 54 from the convergent portion 64 towards the nozzle orifice 60 and to the divergent portion 68. The divergent portion 68 is arranged at (e.g., on, adjacent or proximate) a downstream end 72 of the nozzle passage 44, where the nozzle orifice 60 is fluidly coupled with the nozzle passage 44 and its divergent portion 68 at the nozzle passage downstream end 72. The divergent portion 68 of FIG. 5, for example, extends longitudinally along the longitudinal centerline 54 from the throat portion 66 to the nozzle orifice 60.

The convergent portion 64 is formed by a convergent (e.g., conical) surface 74 of the fuel nozzle 26 and its nozzle tube 48. The nozzle passage 44 of FIG. 5 thereby (e.g., continuously or intermittently) converges radially inward towards the longitudinal centerline 54 as the convergent portion 64 and its associated convergent surface 74 extend longitudinally along the longitudinal centerline 54 from the nozzle passage end surface 70 to (or towards) the throat portion 66 and, more particularly, an upstream end 76 of a throat (e.g., cylindrical) surface 78 of the fuel nozzle 26 and its nozzle tube 48. Thus, a lateral width 80 (e.g., diameter) of the convergent portion 64 at the nozzle passage upstream end 62 is greater than the convergent portion lateral width 80 at the intersection between the portions 64 and 66.

The throat portion 66 is formed by the throat surface 78. A lateral width 82 (e.g., diameter) of the throat portion 66 may be uniform along its longitudinal length 84. Thus, the throat portion lateral width 82 at the intersection between the portions 64 and 66 may be equal to the throat portion lateral width 82 at the intersection between the portions 66 and 68. This throat portion lateral width 82 may be equal to the convergent portion lateral width 80 at the intersection between the portions 64 and 66, and less than the convergent portion lateral width 80 at the nozzle passage upstream end 62.

The throat portion longitudinal length 84 extends longitudinally along the longitudinal centerline 54 from the upstream end 76 to a downstream end 86 of the throat surface 78. This throat portion longitudinal length 84 of FIG. 5 is less than a longitudinal length 88 of the convergent portion 64, which convergent portion longitudinal length 88 extends longitudinally along the longitudinal centerline 54 from the nozzle passage end surface 70 to the upstream end 76 of the throat surface 78. The convergent portion longitudinal length 88, for example, may be at least two times (2×), five times (5×) or ten times (10×) the throat portion longitudinal length 84. The present disclosure, however, is not limited to the foregoing exemplary ratios.

The divergent portion 68 is formed by a divergent (e.g., conical) surface 90 of the fuel nozzle 26 and its nozzle tube 48. The nozzle passage 44 of FIG. 5 thereby (e.g., continuously or intermittently) diverges radially away from the longitudinal centerline 54 as the divergent portion 68 and its associated divergent surface 90 extend longitudinally along the longitudinal centerline 54 from the throat portion 66 and, more particularly, its downstream end 86 to (or towards) the fuel nozzle distal end 40 and the nozzle orifice 60. Thus, a lateral width 92 (e.g., diameter) of the divergent portion 68 at the intersection between the portions 66 and 68 is less than the divergent portion lateral width 92 at the fuel nozzle distal end 40 and the nozzle orifice 60. A maximum value of the divergent portion lateral width 92 (e.g., at the fuel nozzle distal end 40 and the nozzle orifice 60) may be equal to or different (e.g., greater or less) than a maximum value of the convergent portion lateral width 80 (e.g., at the nozzle passage end surface 70). The maximum lateral width of the divergent portion 68, for example, may be at least 1.1 times (1.1×), 1.3 times (1.3×), 1.5 times (1.5×) or two times (2×) the maximum lateral width of the convergent portion 64. The present disclosure, however, is not limited to the foregoing exemplary ratios.

The divergent portion 68 has a longitudinal length 94 that extends longitudinally along the longitudinal centerline 54 from the downstream end 86 to the fuel nozzle distal end 40 and/or the nozzle orifice 60. This divergent portion longitudinal length 94 of FIG. 5 may be equal to or greater than the throat portion longitudinal length 84. The divergent portion longitudinal length 94 of FIG. 5 may also be less than the convergent portion longitudinal length 88. The convergent portion longitudinal length 88, for example, may be at least two times (2×), five times (5×) or ten times (10×) the divergent portion longitudinal length 94. The present disclosure, however, is not limited to the foregoing exemplary ratios.

Figure 6:
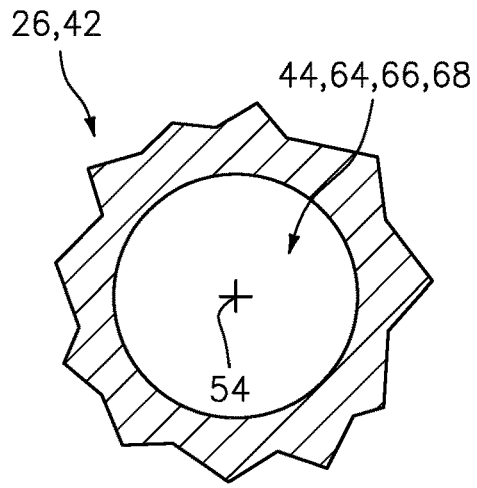
FIGS. 6-8 are cross-sectional illustrations of a nozzle passage within a nozzle conduit having various shapes.
Figure 7:
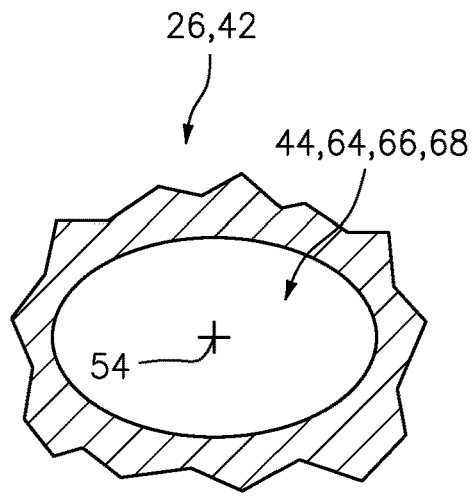
Figure 8:
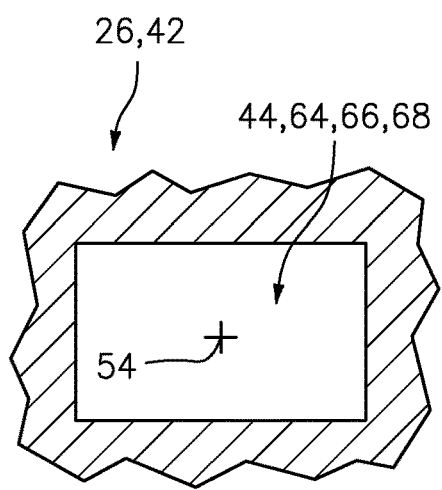

Referring to FIG. 6, the nozzle passage 44 and one or more or each of its portions 64, 66, 68 has a cross-sectional geometry when viewed, for example, in a plane perpendicular to the longitudinal centerline 54. The cross-sectional geometry of FIG. 6 is circular shaped. The present disclosure, however, is not limited to such an exemplary circular cross-sectional geometry. The cross-sectional geometry of one or more or each of nozzle passage portions, for example, may alternatively be non-circular shaped; e.g., oval or elliptical shaped as shown in FIG. 7 for example, polygonal (e.g., rectangular) shaped as shown in FIG. 8 for example, etc.

Referring to FIG. 5, the fuel aperture 36 is between and fluidly couples the supply passage 32 with the nozzle passage 44. The fuel aperture 36 of FIG. 5, for example, is configured in and pierces the end wall 58 between the supply passage 32 and the nozzle passage 44. More particularly, the fuel aperture 36 extends along a centerline 96 through an intermediate portion of the apparatus (e.g., the end wall 58) from, for example, an (e.g., tubular) inner surface 98 of the fuel conduit 24 at least partially forming the supply passage 32 to the nozzle passage end surface 70.

Figure 9:
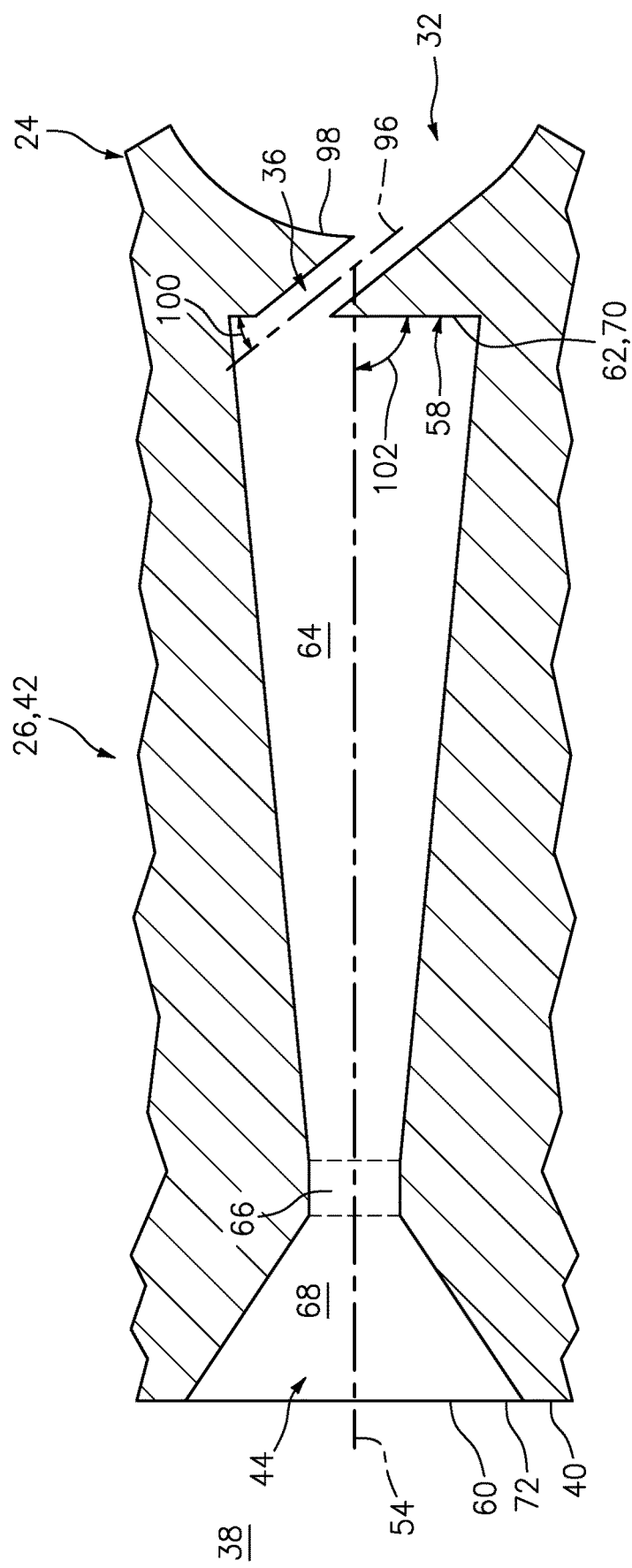
FIG. 9 is a side sectional illustration of another portion of the fuel injector assembly.

The fuel aperture 36 and its centerline 96 may be laterally offset from the longitudinal centerline 54 and towards a side of the nozzle passage 44. Referring to FIG. 9, the fuel aperture 36 and its centerline 96 may also or alternatively be angularly offset from (e.g., non-parallel with) the longitudinal centerline 54. For example, the fuel aperture centerline 96 may be angularly offset from the nozzle passage end surface 70 by an acute included angle 100, whereas the longitudinal centerline 54 may be angularly offset from the nozzle passage end surface 70 by a right (90 degree) angle 102. With such a configuration, the fuel aperture 36 is configured to direct fuel from the supply passage 32 into the nozzle passage 44 along a canted trajectory such that the fuel may spiral around the longitudinal centerline 54 as the fuel moves longitudinally along the longitudinal centerline 54 through the nozzle passage 44 and towards the nozzle orifice 60; see also FIGS. 10A and 10B. The fuel aperture 36 may thereby be configured to swirler fuel within the nozzle passage 44.

Figure 10A:
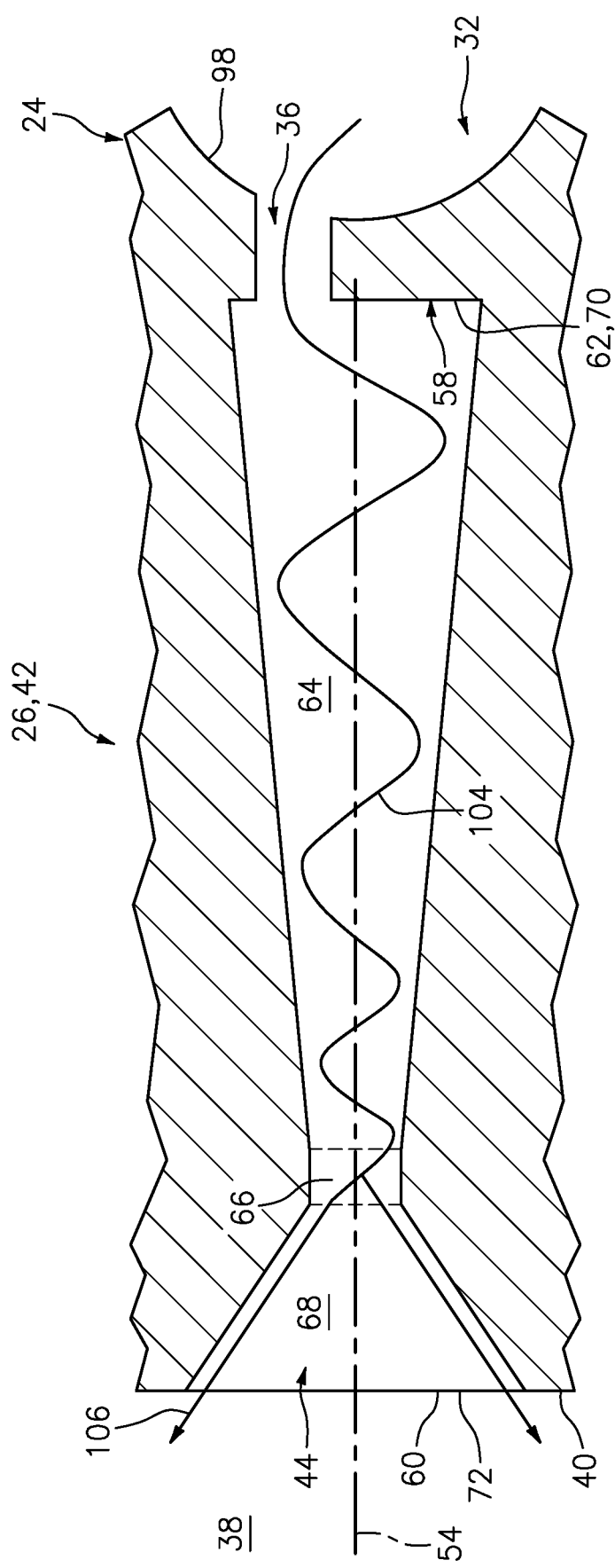
FIG. 10A is a side sectional illustration of the portion of the fuel injector assembly in FIG. 5 depicted with fuel flowing along an exemplary trajectory.
Figure 10B:
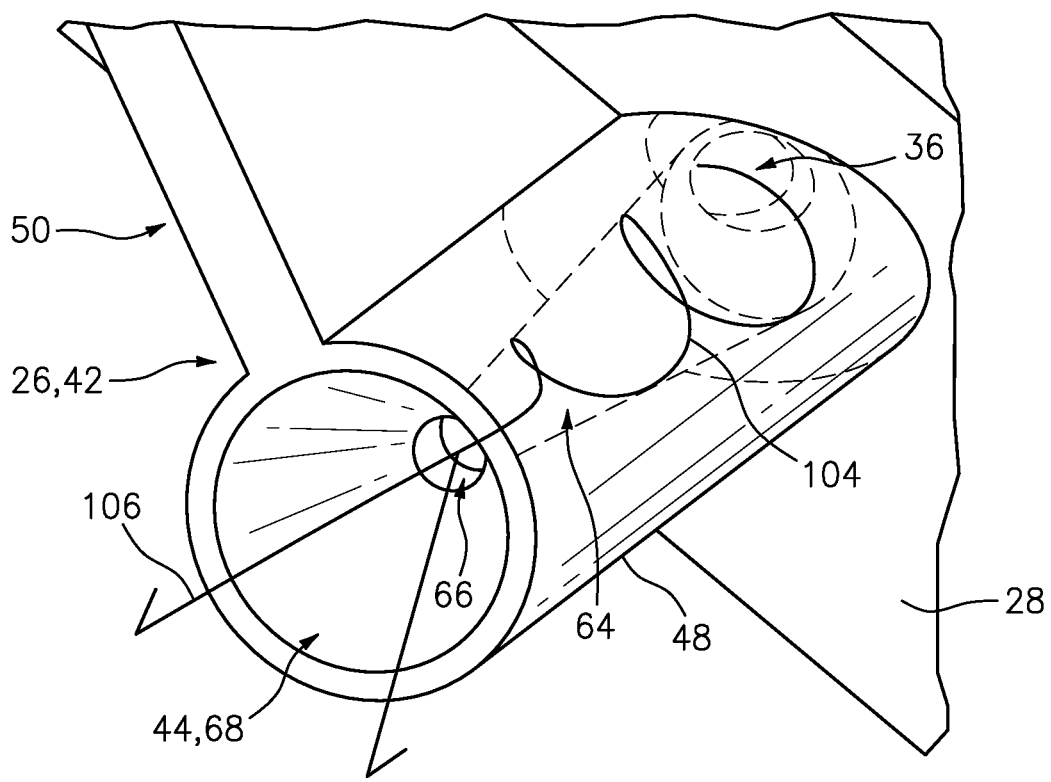
FIG. 10B is a perspective ghost view illustration of another portion of the fuel injector assembly with fuel flowing along the exemplary trajectory.

Referring to FIGS. 10A and 10B, during turbine engine operation, fuel is directed into the supply passage 32 from a fuel source (not shown). The fuel aperture 36 directs at least a portion of the fuel from the supply passage 32 into the nozzle passage 44 along a spiral/swirled trajectory 104. This swirled fuel is accelerated within the convergent portion 64. The accelerated and swirled fuel is then injected into the plenum 38 through the nozzle orifice 60 as a hollow cone 106.

Figure 11:
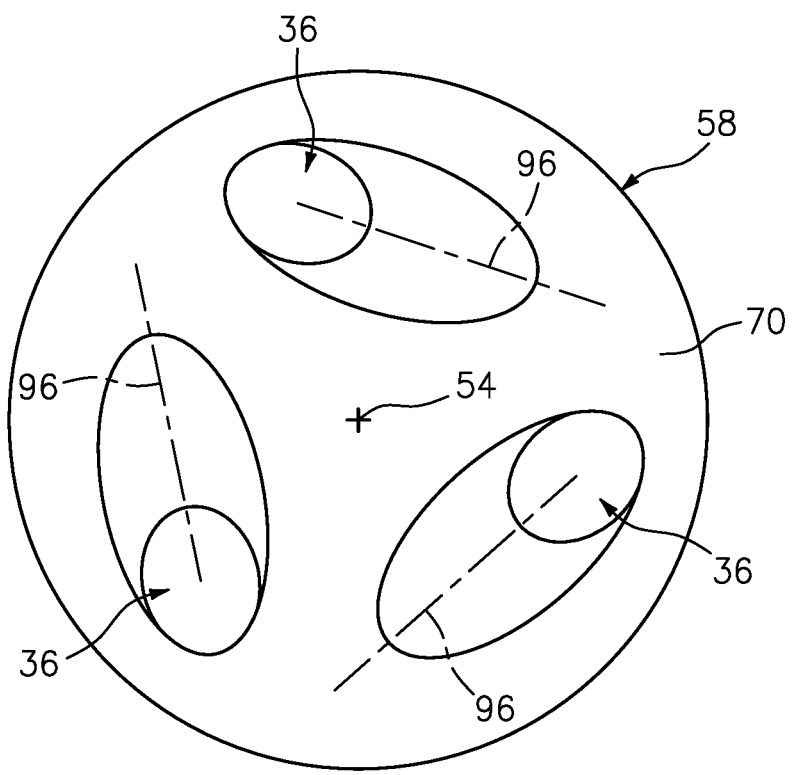
FIG. 11 is an illustration of an end wall configured with a plurality of fuel apertures.

In some embodiments, referring to FIG. 11, the fuel aperture 36 may be one of a plurality of fuel apertures 36 in and piercing the end wall 58. These fuel apertures 36 may be arranged circumferentially about the longitudinal centerline 54 in an annular array. Each of the fuel apertures 36 may be configured as described above so as to direct fuel into the nozzle passage 44 along a spiral/swirled trajectory; e.g., see FIGS. 10A and 10B.

Figure 12:
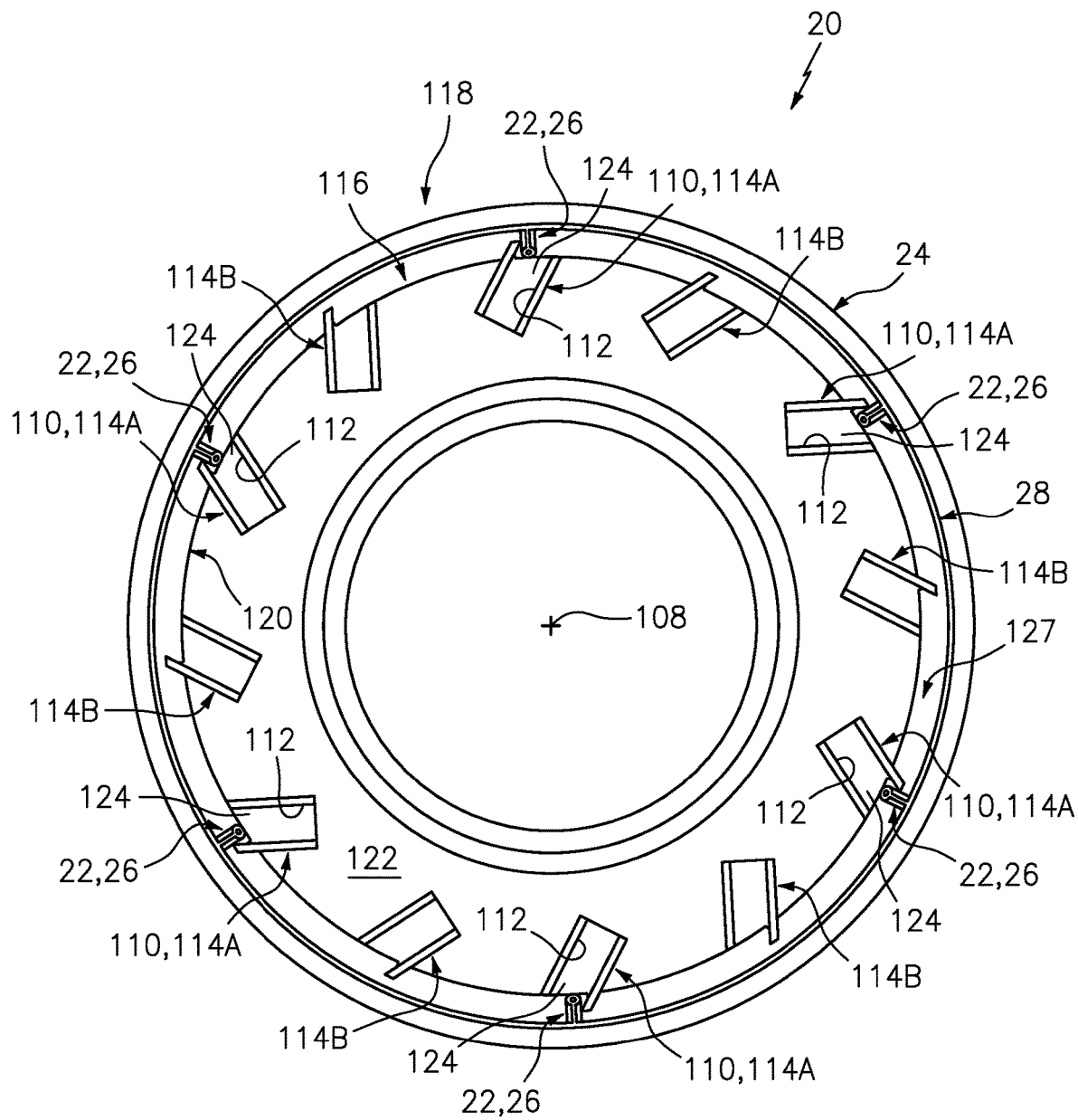
FIG. 12 is a cross-sectional illustration of a combustor section configured with a plurality of the fuel injector assemblies.

In some embodiments, referring to FIG. 12, the fuel nozzle 26 may be one of a plurality of fuel nozzles 26 connected to the base 28 and fluidly coupled with the fuel conduit 24. These fuel nozzles 26 may be arranged circumferentially about a centerline/rotational axis 108 of the turbine engine in an annular array.

In some embodiments, referring to FIGS. 1 and 12, the base 28, the fuel conduit 24 and each fuel nozzle 26 may be configured together in a monolithic body. The present disclosure, however, is not limited to such an exemplary construction. For example, in other embodiments, one or more or each of the apparatus components 24, 26 and/or 28 and/or portions thereof may be individually formed and subsequently connected (e.g., fastener and/or bonded) together.

Figure 13:
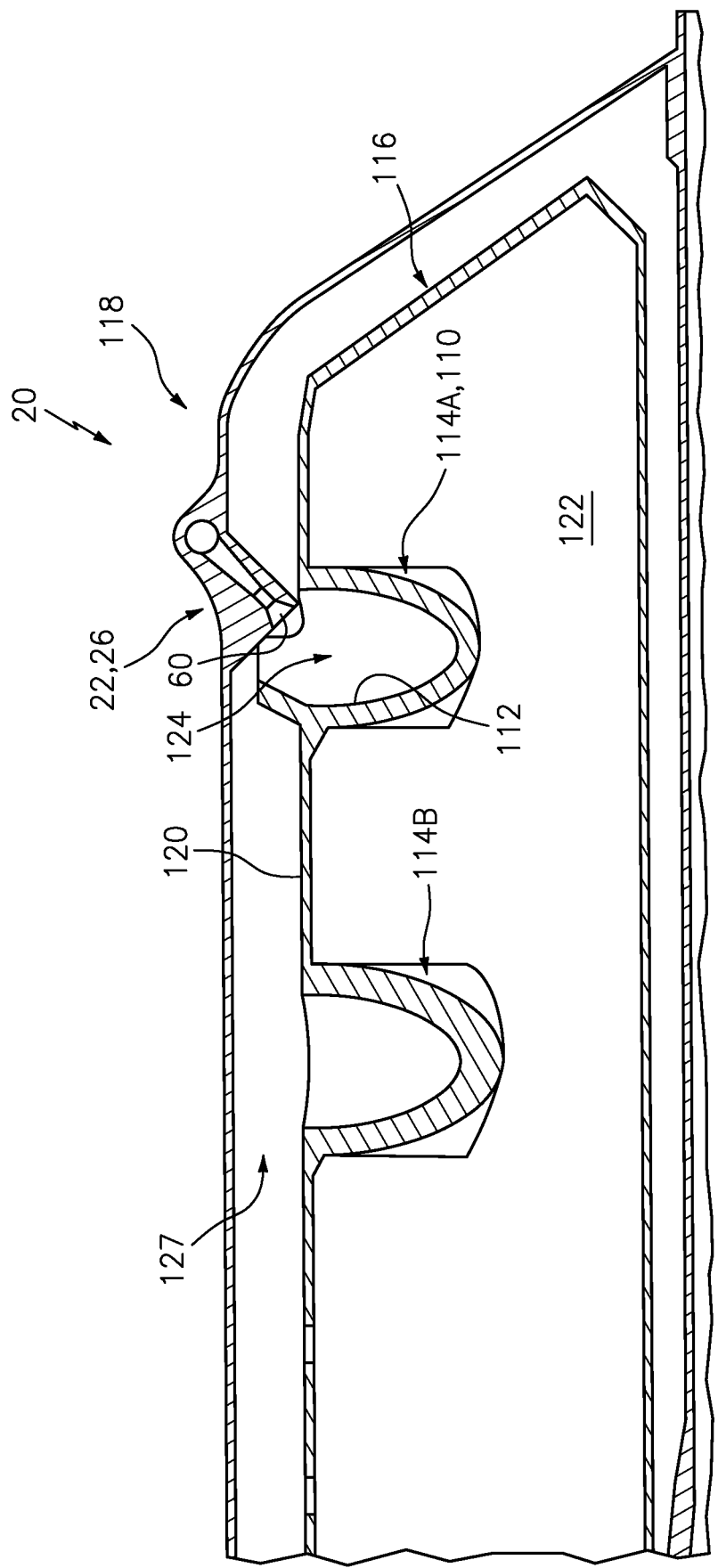
FIG. 13 is a partial side sectional illustration of a portion of the combustor section.

In some embodiments, referring to FIGS. 12 and 13, the turbine engine apparatus 20 may also include one or more fuel vaporizers 110. Each fuel nozzle 26 is arranged with a respective one of the fuel vaporizers 110. Each fuel nozzle 26 is configured to direct fuel out of its nozzle orifice 60 to impinge a surface 112 of the respective fuel vaporizer 110. The fuel vaporizer 110 may thereby enable initial or further vaporization of the fuel.

In the specific embodiment of FIGS. 12 and 13, each fuel vaporizer 110 is configured as an air tube 114A for a combustor 116 in the combustor section 118. Note, the combustor 116 may also include at least one air tube 114B in between, for example, each circumferentially neighboring set of the vaporizers 110. Each of the air tubes 114A is connected to and projects out from a wall 120 of the combustor 116 and into a combustion chamber 122 at least partially defined by the combustor wall 120. An air passage 124 of each air tube 114A is configured to receive air and, more particularly, compressed air from a compressor section of the turbine engine (not visible in FIGS. 12 and 13) through a plenum 127. This compressed air is directed through the respective air passage 124 and into the combustion chamber 122. However, before reaching the combustion chamber 122, the air within the respective air passage 124 is mixed with fuel expelled from a respective one of the fuel nozzles 26 to provide a mixture of compressed air and atomized fuel. By swirling and accelerating the fuel within the respective fuel nozzle 26, the fuel may be more likely to atomize within the respective air passage 124; e.g., upon entering the air passage 124 from the nozzle passage 44 and/or upon impinging against the surface 112 (e.g., an inner side wall surface of the air tube 144A). By increasing atomization of the fuel, the fuel injector assembly 22 may reduce the likelihood of carbon buildup within the plenum 38 and/or within a combustion chamber 122.

Figure 14:
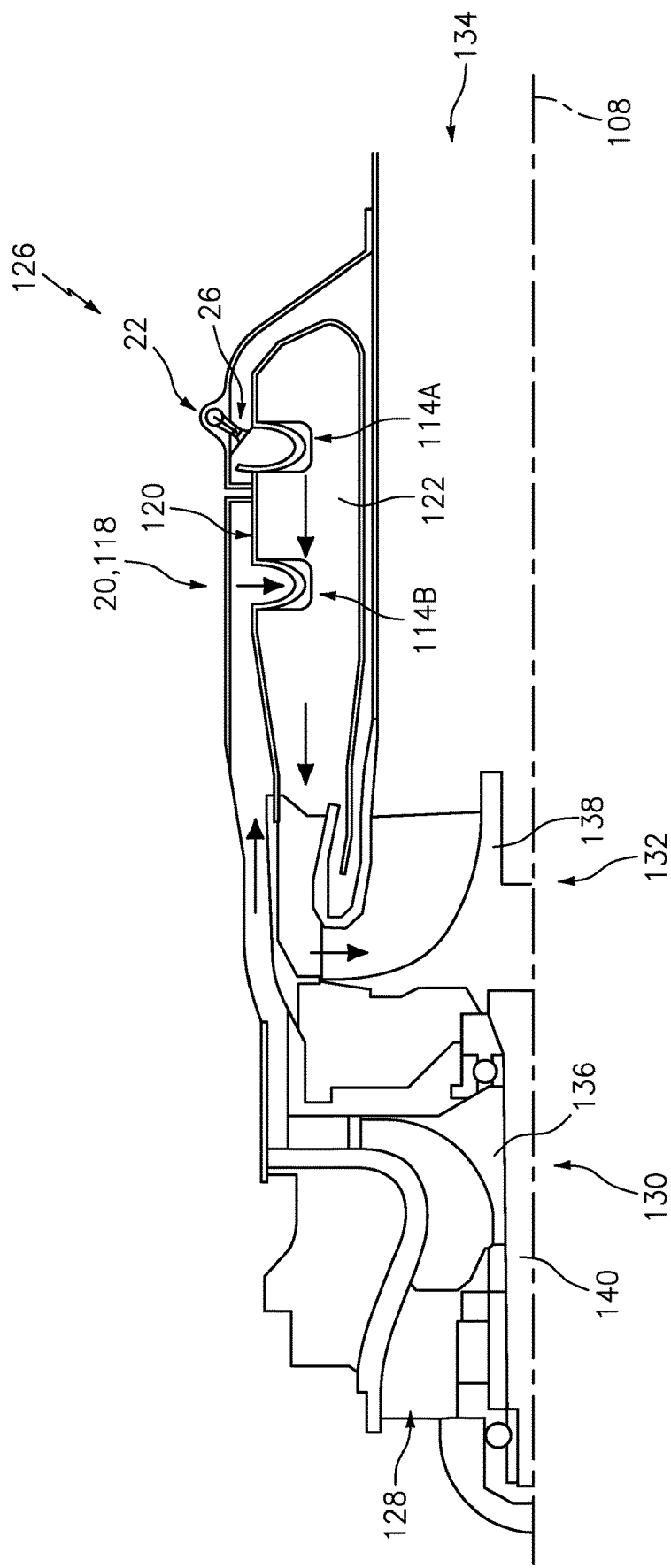
FIG. 14 is a partial side schematic illustration of a turbine engine.

The turbine engine apparatus 20 of the present disclosure may be configured with different types and configurations of turbine engines. FIG. 14 illustrates one such type and configuration of the turbine engine—a one-spool, radial-flow turbojet turbine engine 126 configured for propelling an unmanned aerial vehicle (UAV), a drone or any other aircraft or self-propelled projectile. In the specific embodiment of FIG. 14, the turbine engine 126 includes an upstream inlet 128, a (e.g., radial) compressor section 130, the combustor section 118, a (e.g., radial) turbine section 132 and a downstream exhaust 134 fluidly coupled in series. A compressor rotor 136 in the compressor section 130 is coupled with a turbine rotor 138 in the turbine section 132 by a shaft 140, which rotates about the centerline/rotational axis 108 of the turbine engine 126.

The turbine engine apparatus 20 may be included in various turbine engines other than the one described above. The turbine engine apparatus 20, for example, may be included in a geared turbine engine where a gear train connects one or more shafts to one or more rotors in a fan section, a compressor section and/or any other engine section. Alternatively, the turbine engine apparatus 20 may be included in a turbine engine configured without a gear train. The turbine engine apparatus 20 may be included in a geared or non-geared turbine engine configured with a single spool (e.g., see FIG. 14), with two spools, or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
a fuel conduit comprising a supply passage; and
a fuel nozzle comprising a nozzle passage, an end wall, and a nozzle orifice;
the nozzle passage having a longitudinal centerline and extending longitudinally through the fuel nozzle along the longitudinal centerline from the end wall to the nozzle orifice, the nozzle passage configured with a convergent portion and a throat portion, and the nozzle passage converging radially inward towards the longitudinal centerline as the convergent portion extends longitudinally along the longitudinal centerline from the end wall and to the throat portion; and
the end wall having a radially extending face with respect to the longitudinal centerline;
the supply passage fluidly coupled to the nozzle passage by a fuel aperture in the radially extending face, and a centerline of the fuel aperture angularly and laterally offset from the longitudinal centerline.

2. The apparatus of claim 1, wherein the fuel aperture is configured to direct fuel from the supply passage into the nozzle passage along a canted trajectory such that the fuel spirals around the longitudinal centerline.

3. The apparatus of claim 1, wherein the fuel aperture is configured to swirl fuel directed into the nozzle passage from the supply passage.

4. The apparatus of claim 1, wherein a longitudinal length of the convergent portion is greater than a longitudinal length of the throat portion.

5. The apparatus of claim 1, wherein
the nozzle passage is further configured with a divergent portion; and
the nozzle passage diverges radially outward away from the longitudinal centerline as the divergent portion extends longitudinally along the longitudinal centerline away from the throat portion and towards the nozzle orifice.

6. The apparatus of claim 5, wherein a longitudinal length of the convergent portion is greater than a longitudinal length of the divergent portion.

7. The apparatus of claim 6, wherein the longitudinal length of the divergent portion is greater than a longitudinal length of the throat portion.

8. The apparatus of claim 5, wherein a maximum lateral width of the divergent portion is equal to or greater than a maximum lateral width of the convergent portion.

9. The apparatus of claim 1, wherein
the supply passage is further fluidly coupled to the nozzle passage by a second fuel aperture in the radially extending face; and
a centerline of the second fuel aperture is angularly and laterally offset from the longitudinal centerline.

10. The apparatus of claim 1, further comprising:
a fuel vaporizer;
the fuel nozzle configured to direct fuel out from the nozzle orifice and against the fuel vaporizer.

11. The apparatus of claim 1, further comprising:
an air tube comprising an air passage;
the fuel nozzle configured to direct fuel out from the nozzle orifice and into the air passage to impinge against an inner sidewall surface of the air tube.

12. The apparatus of claim 11, further comprising:
a combustor wall at least partially forming a combustion chamber;
the air tube connected to the combustor wall and projecting into the combustion chamber.

13. The apparatus of claim 1, further comprising:
a turbine engine case;
the fuel nozzle including a nozzle tube and a web, the nozzle tube projecting out from the turbine engine case and at least partially forming the nozzle passage, and the web extending between the turbine engine case and the nozzle tube.

14. The apparatus of claim 1, further comprising:
a turbine engine case;
the fuel conduit, the fuel nozzle and the turbine engine case formed together in a monolithic body.

15. The apparatus of claim 1, further comprising:
a second fuel nozzle comprising a second nozzle passage, a second end wall and a second nozzle orifice;
the second nozzle passage having a second longitudinal centerline and extending longitudinally through the second fuel nozzle along the second longitudinal centerline from the second end wall to the second nozzle orifice, the second nozzle passage configured with a second convergent portion and a second throat portion, and the second nozzle passage converging radially inward towards the second longitudinal centerline as the second convergent portion extends longitudinally along the second longitudinal centerline away from the second end wall and towards the second throat portion; and
the supply passage fluidly coupled to the second nozzle passage by a second fuel aperture in the second end wall, and a centerline of the second fuel aperture angularly and laterally offset from the second longitudinal centerline.

* * * * *